US012548543B2

(12) United States Patent
Berkhoff et al.

(10) Patent No.: US 12,548,543 B2
(45) Date of Patent: Feb. 10, 2026

(54) ACTIVE SOUND-CANCELLATION SYSTEM FOR AN OPEN FLUID-DUCT

(71) Applicant: Novio Sound B.V., Enschede (NL)

(72) Inventors: Arthur Perry Berkhoff, Enschede (NL); David George Bradford, Enschede (NL)

(73) Assignee: Novio Sound B.V., Enschede (NL)

( * ) Notice: Subject to any disclaimer, the term of this patent is extended or adjusted under 35 U.S.C. 154(b) by 243 days.

(21) Appl. No.: 18/569,955

(22) PCT Filed: Jun. 16, 2022

(86) PCT No.: PCT/NL2022/050341
§ 371 (c)(1),
(2) Date: Dec. 13, 2023

(87) PCT Pub. No.: WO2022/265508
PCT Pub. Date: Dec. 22, 2022

(65) Prior Publication Data
US 2024/0282288 A1 Aug. 22, 2024

(30) Foreign Application Priority Data
Jun. 16, 2021 (NL) ..................................... 2028463

(51) Int. Cl.
*G10K 11/16* (2006.01)
*G10K 11/178* (2006.01)

(52) U.S. Cl.
CPC .. *G10K 11/17815* (2018.01); *G10K 11/17817* (2018.01); *G10K 11/17881* (2018.01); *G10K 2210/112* (2013.01); *G10K 2210/3026* (2013.01); *G10K 2210/3027* (2013.01); *G10K 2210/3028* (2013.01); *G10K 2210/3046* (2013.01); *G10K 2210/3215* (2013.01); *G10K 2210/3219* (2013.01)

(58) Field of Classification Search
CPC ....... G10K 11/17815; G10K 11/17881; G10K 11/17817; G10K 2210/112; G10K 2210/3026; G10K 2210/3027; G10K 2210/3028; G10K 2210/3046; G10K 2210/3215; G10K 2210/3219
USPC ............................................... 381/71.1, 71.5
See application file for complete search history.

(56) References Cited

U.S. PATENT DOCUMENTS 4,044,203 A 8/1977 Swinbanks
5,382,134 A 1/1995 Pla et al.
2021/0092532 A1* 3/2021 Langevoort .......... H04R 25/505

OTHER PUBLICATIONS

International Search Report and Written Opinion received for PCT Patent Application No. PCT/NL2022/050341, dated Aug. 31, 2022, 13 pages.

(Continued)

*Primary Examiner* — Ammar T Hamid
(74) *Attorney, Agent, or Firm* — AEON Law, PLLC; Adam L.K. Philipp; Charlotte E. Holoubek

(57) ABSTRACT

The present invention is in the field of an active sound-cancellation system, an open fluid-duct comprising such an active sound-cancellation system, such as an air duct, and an active sound-cancellation computer program comprising instructions for operating such an active sound-cancellation system. The active sound-cancellation system reduces noise significantly.

20 Claims, 6 Drawing Sheets

(56) References Cited

OTHER PUBLICATIONS

Jansen, "Active noise control in ventilation ducts using a distributed loudspeaker and microphone array", Jun. 17, 2021, pp. 1-18.

* cited by examiner

ACTIVE SOUND-CANCELLATION SYSTEM FOR AN OPEN FLUID-DUCT

RELATED APPLICATIONS

This application is a national phase entry of PCT International Patent Application No. PCT/NL2022/050341, filed Jun. 16, 2022, in the name of "Novio Sound B.V." [NL], which claims the benefit of priority of Netherlands Patent Application Serial No. 2028463, filed Jun. 16, 2021, in the name of "Novio Sound B.V." [NL]. The entire contents of the above-referenced applications and of all priority documents referenced in the Application Data Sheet filed herewith are hereby incorporated by reference for all purposes.

FIELD OF THE INVENTION

The present invention is in the field of an active sound-cancellation system, an open fluid-duct comprising such an active sound-cancellation system, such as an air duct, and an active sound-cancellation computer program comprising instructions for operating such an active sound-cancellation system. The active sound-cancellation system reduces noise significantly.

BACKGROUND OF THE INVENTION

The present invention relates to sound cancellation, and in particular to noise cancellation. Noise is a form of typically unwanted sound. Sound is a considered to be a vibration that propagates as an acoustic wave, through a transmission medium such as a fluid, gas, liquid or solid. Humans and animals can perceive sound. Sound is the reception of such waves and their perception by the brain. Only acoustic waves that have frequencies lying between about 20 Hz and about 20 kHz, which is typically referred to as audio frequency range, can be perceived by humans. Different animal species have varying hearing ranges, for instance a dog is able to perceive sound in a range of 10 Hz-35 kHz, and a bat even in arrange of 100 Hz-100 KHz.

Sound can propagate through a medium such as air, water or solids as longitudinal waves. A sound source creates vibrations in the surrounding medium. As the source continues to vibrate the medium, the vibrations propagate away from the source at the speed of sound, thus forming the sound wave. Sound pressure is the difference, in a given medium, between average local pressure and the pressure in the sound wave. Although the unit Pa could be used, typically the logarithmic unit dB is used. For the unit dB a reference sound pressure is used. Commonly used reference sound pressures, defined in the standard ANSI S1.1-1994, are 20 μPa in air and 1 μPa in water. For the present application said reference value is typically that of water or air, respectively.

As mentioned, noise is unwanted sound. It is often perceived as unpleasant, for both humans and animals. Noise is not directly distinguishable from desired sound, as both relate to vibrations through a medium, such as air or water. In the present case however, when considering a duct for instance, any sound may be considered unwanted, and therefore considered as noise. The noise can typically be distributed over a frequency range. Acoustic noise is any sound in the acoustic domain, either deliberate, or accidental; in the present case mainly unintended.

As exposure to noise is associated with several negative health outcomes, it is an objective to reduce noise, in particular in fluid ducts. Noise is associated with hearing loss, high blood pressure, ischemic heart disease, sleep disturbances, injuries, decreased performance, annoyance, psychiatric disorders, and effects on psychosocial well-being. Therefore, noise exposure has increasingly been identified as a public health issue, especially in an occupational setting.

Earbuds or the like may be used, but these have a limited sound reduction at middle and higher frequencies. Likewise passive sound isolation from the environment can be used, such as a headphone, but also these function best at lower (bass) sound ranges, and are limited in active sound reduction at higher ranges.

Some prior art may be relied on. US 2021/092532 A1 recites an intra ear canal hearing aid, a pair of said hearing aids and use of said hearing aids. Such a hearing aid is designed to improve or support hearing. It typically relates to an electroacoustic device that is capable of transforming sound, thereby reducing noise and typically amplifying certain parts of the audio frequency spectrum. In addition such as hearing aid may improve directional perception of sound. U.S. Pat. No. 4,044,203 A recites a sound wave propagated along a duct through a fluid contained in the duct which is attenuated by generating sound waves from an array of sound sources spaced along the duct. Each source generates two waves travelling in opposite directions; those travelling in the same direction as the unwanted wave sum to give a resultant which interferes destructively with the unwanted wave, while those travelling in the opposite direction sum to give a negligible resultant. The source array may be operated in response to detection of the unwanted wave. U.S. Pat. No. 5,382,134 A recites a noise source for an aircraft engine active noise cancellation system in which the resonant frequency of a noise radiating element is tuned to permit noise cancellation over a wide range of frequencies. The resonant frequency of the noise radiating element is tuned by a plurality of force transmitting mechanisms which contact the noise radiating element. Each one of the force transmitting mechanisms includes an expandable element and a spring in contact with the noise radiating element so that excitation of the element varies the spring force applied to the noise radiating element. The elements are actuated by a controller which receives input of a signal proportional to displacement of the noise radiating element and a signal corresponding to the blade passage frequency of the engine's fan. In response, the controller determines a control signal which is sent to the elements and causes the spring force applied to the noise radiating element to be varied. The force transmitting mechanisms can be arranged to either produce bending or linear stiffness variations in the noise radiating element.

The present invention relates in particular to an improved active sound-cancellation system and various aspects thereof which overcomes one or more of the above disadvantages, without jeopardizing functionality and advantages.

SUMMARY OF THE INVENTION

The present invention relates in a first aspect to an active sound-cancellation system, which may be regarded as a multi-input-multi-output system, in a second aspect to an open fluid-duct comprising such an active sound-cancellation system, such as an air duct, and in a third aspect to an active sound-cancellation computer program comprising instructions for operating such an active sound-cancellation system. The active sound-cancellation system reduces noise significantly. Compared to e.g. headphones and ear buds the present active sound-cancellation system provides better reductions over the full frequency range (see e.g. FIG. 6).

The present active sound-cancellation system for an open fluid-duct comprises a carrier, the carrier comprising at least one fixator for fixing the carrier to the duct, at least one axial array of $n_s \times m_s$ audio sensors and $n_a \times m_a$ audio actuators, wherein an array is typically a regular or irregular 2-dimensional pattern (in x- and y-direction) in this case of sensors and/or actuators arranged therein, so multiple inputs (sensors) and multiple outputs (actuators), wherein sensors and actuators are typically distributed in space, such as over a longitudinal axis of the duct, and wherein for sensors and actuators the term "audio" may include at least part of the ultrasound domain, wherein, each individually, $n_{a,s} \geq 2$, and $m_{a,s} \geq 1$, wherein $n_s$ sensors and $n_a$ actuators are parallel to the axis of the duct, in particular wherein $n_{a,s} \in [3,2^{10}]$, more in particular $n_{a,s} \in [4,2^8]$, even more in particular $n_{a,s} \in [6,2^6]$, such as $n_{a,s} \in [8,2^4]$, and wherein $m_{a,s} \in [2,2^6]$, more in particular $m_{a,s} \in [3,2^5]$, even more in particular $m_{a,s} \in [4,2^4]$, such as $m_{a,s} \in [6,8]$, so wherein a large number of sensors and actuators is in principle possible, such as depending on sound generation in the duct, a size of the duct, and sound pressure levels, wherein a power or likewise pressure level of the actuator may be adapted to a pressure level in the duct, hence larger and smaller actuators are envisaged, wherein each individual actuator is adjacent along a horizontal axis of the sound-cancellation system from at least one an individual sensor, at least one sound-cancellation controller, wherein the at least one sound-cancellation controller is configured to receive audio input from at least one sensor array, configured to process said audio input, and configured to provide output to at least one actuator array, wherein said output activates the actuator to reduce sound in a frequency domain of 10 Hz-100 kHz, wherein at least one sound-cancellation controller is preferably adaptable. The horizontal axis may be considered as the main axis along which sound propagates. Typically sensors and actuators may be provided in pairs, such as is shown in FIG. 2*b*, but triplets of sensor/actuator/sensor may also be considered, and so on. It is considered that above 100 kHz most animals and humans do not perceive sound, and therefore cancellation is not directly required. The present sound-cancellation provides versatility, e.g. in terms of possible configurations of the single or multiple array elements, a range of possible applications, a range of possible configurations of the duct system, application in a duct in a fluid flow direction, or in absence of flow in a stationary fluid, good control typically at various points, such as exit, entry, branch, and arbitrary points in a duct. Advantages are amongst others in view of performance improvements in both reduction and broad range of frequency reduction are provided, in particular by the multiple-input-multiple output of the present system, and in view of robustness a greater tolerance to changes in fluid properties (for example, density and temperature) and tolerance to position of system components and ANC components (duct components and the arrays) is provided. On an example 125 mm system that has been well designed using past practice the MIMO solution offers at least 6 dB SPL improvement and more typically 10 dB and even 20 dB for unoptimized solutions using previous technology. In a next step 22 dB was already achieved, whereas now a level of 40 dB was achieved. Compared to prior art, it was found that this was already sensitivity to placement variations of 10% of duct diameter with potentially significant impact when duct and array elements vary from design position by 50% to 100% of duct diameter. The present MIMO approach reduces placement sensitivity by a fact or at least ×2 and more typically times ×5. Indirect benefits are reduced cost of achieving a noise performance and a reduced size of the system, which for instance allows for an increased airflow without increasing noise. The efficiency, implementation, observability and controllability are also improved. Also imperfections in sound-cancellation of a first actuator can be observed by a subsequent sensor, and be corrected at least partly by a subsequent actuator or feedback to correct the same actuator. Although the present active sound-cancellation system is particularly suited for use in an acoustically open duct, it is also suited for use in an acoustically half-open or partly open ducts, and combinations thereof.

With respect to a duct the following non-limiting statements are noted. Ducts may have branches and may typically have multiple openings and closed ends and may include half closed ends. The may be irregular along the duct length. They may have irregular cross section and irregular 3D transitions between section. A duct may be a series of transitions between irregular 3D shapes (as in an ear canal). Also conical or horn shaped structures where opening is much larger than average diameter are considered as duct. A noise reduction goal can be to minimise noise at a single point or to minimise noise across several points distributed across a volume. The noise disturbance may be internal or external depending on the application. The noise disturbance may typically have multiple sources (especially if disturbance is external to duct system).

Examples relate to for instance an ear-canal, wherein a disturbance may relate to external sounds. A sound reduction relates to an end point (eardrum) or near end point (volume of ear canal adjacent to eardrum) reduction typically optimised and or maximised for most effective sound reduction. Or to a ventilation duct, wherein internal disturbances from fans, valves, air flow acoustic effects, airflow vibration effects. External disturbances may come from coupled sound via termination points (EG: voices from adjacent rooms). The sound reduction is aimed at reducing noise. Or to exhaust or air intake systems, wherein internal disturbances from machinery and air flow are present. External disturbances from airflow at aperture. Noise minimisation at aperture.

The present inventors use an axial array. Typically, axial follows the direction of sound travel relevant to the implemented noise cancellation application. Neither the duct nor sound are constrained to the straight line—sound will follow the duct. Sound elements forming the array are typically spatially separated along this sound path. The sound elements themselves may be situated anywhere on the plane orthogonal at that axial distance. They may also vary from the orthogonal plane to take account of the duct geometry in that area, to optimise for sound delays, or to simplify mounting or fixings. The axial pathway may be a side of a duct or the central axis or any other pathway that aligns with these pathways and is between sources of sound disturbances and the noise control point or region. The sensitivity of elements in the array may be optimised to cover specific frequency ranges to overcome practical design issues, such as observability and controllability, unwanted amplification of system nonlinearities, device placement tailored to cross sectional area. Low frequency units tend to be larger requiring more volume with higher frequency units smaller and requiring less volume for dB of SPL; and required Model accuracy. Select more higher frequency actuators and fewer lower frequency actuators to cover a broad spectrum effectively.

Each sound sensing element (of the array) at an axial location may consist of one or more microphones (sound pressure detectors). These may be used to provide sensing data on higher order modes (especially in ducts), to provide averaging across multiple microphones (to reduce sensitivity to higher order modes), and to detect the direction of the sound. They may also serve specific controller related purposes to ensure causality or provide local feedback.

Multiple microphones may be provided at the nominal axial location spread over the orthogonal or off orthogonal plane providing option to average sound pressure across the plane, which may be useful for reducing system sensitivity to higher order acoustic modes. Causal Microphones may be used which may also be associated with the actuator array element. Causal microphones associated with a speaker and placed in an axial direction towards the sound disturbance ahead of an actuator. Ideally the microphones are placed as close to the speaker as is practical whilst still ensuring that a change at the sensor input can directly leads to a change at the actuator output. The time taken for the sound to travel from Microphone to speaker is more than the time it takes for the controller to react to the microphone and change the speaker output. The system sample rate dominates followed by filter delays. Actuator feedback microphones may be used as well. A local sensor closely coupled to the actuator that provides useful feedback data to linearise the actuator output. Example may be acoustic sensors, position sensors, flux sensors, capacitive sensors, etc. Directional Microphones may also be used. They can be used to implement general, causal and local feedback microphones, of the foregoing microphones. For sound direction a single array element may consist of at least two microphones spaced along the axial direction (and the orthogonal plane) and separated by a distance related to the system sample rate. Although axial separated their combined function is determined by their axial location and the axial distance between them.

In the present invention transducers may be used. Transducers may be a moving coil, a balanced armature, a piez0-effect, a MEMS, an electrostatic, a thermo-acoustic, etc. An actuator element (typically) at the axial location may be implemented using an array of m actuators, such as in a XMEMs comprising 3×2 array in a single package. The array of m units may also be configured across a plane orthogonal to the axial di-rection or off the orthogonal plane to account for local structure, fixing and acoustic phasing optimisation.

An array of m actuators may be helpful for properly covering the frequency range with multiple transducers (low frequency, mid, high), and for countering higher order acoustic modes (especially in HVAC ducts).

Actuators at different locations in an array may cover different frequencies. Actuator elements may include additional sensors where practical (causal micro-phones or local feedback microphones. Actuators may be directional or omni-directional. Examples of actuators are an omni-direction spherical actuator (piezo electric spheres), a directional moving coil with back volume, a Mems with back volume, and a (Graphene) Thermo-acoustic without back volume.

The present at least one sound-cancellation controller may comprises computer instructions, or an algorithm. The basic controller implementation may aim to ensure that the feedback path(s) are modelled sufficiently accurately to minimise the requirement for feedback control. This may be achieved by developing an internal model that matches the actual feedback path. When the internal model exactly matches the feedback path then only feedforward control is required to achieve high performance. In the Feedforward mode control is inherently stable, a control effort may be minimised saving control action and battery life, and computational resources may be minimised. The algorithm may optionally be implemented as a state space system with computational benefits. Matrix translations and rotations in the algorithm minimise the computational power required to run the algorithm. An array of elements distributes the observation and subsequent control action. This overcomes acoustic observability and controllability issues, provides nonlinearity gain at specific frequencies, overcomes actuator size limitations and actuator Sound pressure level limitations. Sometimes calibration may be required such as during design process, after changes in components or placement (including insertion of hearable), to track environmental effects, and to track component and system drift over lifetime. Calibration processes may be replaced by adaptive processes. Adaptive processes may be used to optimise performance such as by updating feedback path; an optimised feedback path will eliminate the need for feedback control and significantly reduce the control effort preserving battery life; by updating forward path models to deliver improved performance; and to offer another level of personalisation taking account of neuro acoustics.

It is noted that the terms “actuator” and “transducer” may be used interchangeably. It is considered that a transducer isn’t always an actuator, whereas an actuator is always a transducer, so the terms are not fully interchangeable. Transducers are considered to transfer or convert energy, whereas an actuator is configured to move something. Likewise a loud-speaker is considered to convert electric energy to sound energy; it vibrates air, but doesn’t move it. An actuator would also convert electric energy to kinetic, and would move a valve.

In a second aspect the invention relates to an open fluid-duct comprising an active sound-cancellation system according to the invention, wherein the fluid duct preferably is an air-duct, in particular selected from a ventilation, a pump, a heating installation, a cooling installation, a window, an exhaust, a motor of a ship, a motor of a heavy engine, an internal combustion airbreathing engine, such as an internal combustion airbreathing jet engine, a jet-engine, such as a turbojet, a turbofan, a ramjet, and a pulse jet, and a pipe-line. The open duct is at least not fully blocked, and typically mostly or fully open over a cross-section of the duct, hence open. A fluid can pass through substantially unhindered. On the other hand, in view of acoustics, an unblocked end may be considered not acoustically open, since, although air can flow, the end often has a baffle or partial obstruction (sometimes to restrict/balance flow, sometimes to re direct flow). These are partially blocking acoustically, and hence could be considered not fully acoustically open.

In a third aspect the invention relates to an active sound-cancellation computer program comprising instructions for operating an active sound-cancellation system according to the invention, the instructions causing the computer to carry out the following steps: activating the at least one sensor, receiving input from the at least one sensor, the input comprising sound spectral and sound pressure information, activating the at least one actuator, therewith reducing sound pressure in the duct for at least one sound frequency.

Thereby the present invention provides a solution to one or more of the above-mentioned problems.

Advantages of the present description are detailed throughout the description. References to the figures are not limiting, and are only intended to guide the person skilled in the art through details of the present invention.

DETAILED DESCRIPTION OF THE INVENTION

In an exemplary embodiment the present active sound-cancellation may comprise at least one of a clock operating at a frequency of 1 Hz-10 GHZ, preferably 5-100 MHZ, more preferably 10-50 MHZ, even more preferably 15-25 MHZ, at least one low-latency high resolution sigma-delta analogue-digital converter (ADC) for providing a single or multiple-bit output stream, such as 1-64 ADC converters, in particular 2-16 converters, such as a2-8 bit output stream, at least one ADC analogue input, preferably one in-put per ADC, at least one ADC digital output, at least one output being in electrical connection with a digital loop filter, at least one digital loop filter in digital connection with at least one ADC, having at least one digital output, the at least one digital loop filter preferably operating in a time domain, at least one pulse width modulating (PWM) controller for receiving digital output from the digital loop filter and providing PWM output, wherein the controller is programmable and adaptable, wherein the ADC latency in use is preferably one clock cycle, and wherein the sound-cancellation controller is selected from an integrated circuit, from an artificial intelligence unit, in particular a trainable and adaptable artificial intelligence unit, and from embedded software, such as embedded in an IC.

In an exemplary embodiment of the present active sound-cancellation the at least one audio sensor is capable of receiving audio-signals at a frequency of 5-100000 Hz, or at least parts of said range, such as in view of a certain application, specific parts in said range.

In an exemplary embodiment of the present active sound-cancellation the at least one actuator at least one transducer capable of providing audio-signals at a frequency of 5-100000 Hz, or at least parts of said range, such as in view of a certain application, specific parts in said range.

In an exemplary embodiment of the present active sound-cancellation the at least one sensor each individually is configured to sample at a sample frequency of 100 Hz-100 MHz, in particular of 1 kHz-1 MHZ, more in particular of 5-500 kHz.

In an exemplary embodiment of the present active sound-cancellation each sensor individually comprises at least one field effect transistor. The FET may be considered as part of the signal conditioning for the sensor.

In an exemplary embodiment of the present active sound-cancellation a series of $n_s$ and/or $m_s$ sensors is functionally connected in series.

In an exemplary embodiment of the present active sound-cancellation the at least one actuator each individually is configured to provide active sound cancelling at a cancelling frequency of 1 kHz-500 kHz, in particular 10-100 KHz.

In an exemplary embodiment of the present active sound-cancellation the at least one actuator each individually is configured to provide a sound pressure of 20-150 dB, in particular of 30-120 dB.

In an exemplary embodiment of the present active sound-cancellation in a row of n actuators the actuators are configured to be in phase at a given frequency, thereby generating a higher power.

In an exemplary embodiment of the present active sound-cancellation the at least one sensor and at least one actuator are each individually a transducer, in particular the same transducer.

In an exemplary embodiment of the present active sound-cancellation the transducer is selected from a MEMS, a moving coil, a permanent magnet transducer, a balanced armature transducer, a thermo-acoustic device, and a piezo-element.

In an exemplary embodiment of the present active sound-cancellation in an axial array, each individually, each array element is provided with a sensor and an actuator, respectively, or wherein in an axial array, each individually, 50-99% of array elements is provided with a sensor and an actuator, respectively, in particular 80-95% of array element, such as in an asymmetric provision. Therewith an array may be largely or nearly fully populated with sensors and actuators, respectively.

In an exemplary embodiment the present active sound-cancellation may comprise 2-10 axial arrays.

In an exemplary embodiment of the present active sound-cancellation axial arrays are at least partly provided along a horizontal axis.

In the present active sound-cancellation in the longitudinal direction at least one sensor and at least one actuator are each individually spaced apart. Depending on a diameter size said relative spacing may vary. For certain diameters said spacing can be as much as ten times the diameter, in particular in view of noise cancelling: however the spaced apart in particular is at a distance of 1-25% of a duct diameter, more in particular 2-10% thereof, such as 0.1-50 cm.

In an exemplary embodiment of the present active sound-cancellation each individual sensor is coupled to activate an individual actuator, or wherein each individual sensor is coupled to activate more than one individual actuator, such as 3-all actuators.

In an exemplary embodiment of the present active sound-cancellation the fixator is at least one fin.

In an exemplary embodiment of the present active sound-cancellation each actuator individually is configured to provide a sound pressure perpendicular to the longitudinal axis of the system, so across the diameter of the duct, or wherein each actuator individually is configured to provide a sound pressure parallel to the longitudinal axis of the system, or a combination thereof.

In an exemplary embodiment of the present active sound-cancellation an $n+1^{th}$ sensor is positioned adjacent along a horizontal axis of the sound-cancellation system of an $n^{th}$ actuator.

In an exemplary embodiment of the present active sound-cancellation the system comprises at least one of a primary feedforward path and a feedback path for cancellation, the feedforward path receiving output from a sound shaper and providing input to a second adder, the sound shaper preferably configure to shape propagation of a sound wave, phase, and frequency of sound, in particular after noise filtering, more in particular after noise filtering above 100 kHz, the feedback receiving output from the at least one sound-cancellation controller output and providing input to the at least one first adder, in particular one per sensor.

In an exemplary embodiment of the present active sound-cancellation the system comprises at least one of a first adder receiving input from the feedback path and a reference path, respectively, wherein the first adder provides input to a first subtractor of the at least one sound-cancellation controller, wherein the at least one sound-cancellation controller comprises a feed forward sound-cancellation controller receiving input from the first subtractor and providing output to a loop-shaping filter, the loop-shaping filter providing input to the sound-cancellation controller output and to an estimator in a sound-cancellation controller feedback path, the sound-cancellation controller feedback path providing input to first subtractor for subtracting from the first adder, in particular one per sensor.

In an exemplary embodiment of the present active sound-cancellation the system further comprises at least one of a secondary path receiving input from the sound-cancellation controller output and providing output to a second adder, the second adder optionally providing output to an error sensor, in particular one per sensor In an exemplary embodiment of the present open fluid-duct comprising an active sound-cancellation system a frontal surface area of the active sound-cancellation system is 2-50% or 75% of the cross-sectional area of the duct, in particular 5-20% of the cross-sectional area of the duct, more in particular 7-10% thereof.

In an exemplary embodiment the present active sound-cancellation computer program may comprise instructions to activate two or more sensors simultaneously, in particular 4 to $n_s \times m_s$ sensors simultaneously.

In an exemplary embodiment the present active sound-cancellation computer program may comprise instructions to activate two or more actuators simultaneously, in particular 4 to $n_a \times m_a$ actuators simultaneously [Multi Input Multi Output]. In an exemplary embodiment the present active sound-cancellation computer program may comprise instructions to measure the sound pressure over the duct, in particular to measure the sound pressure over a longitudinal axis of the duct and/or over a cross-sectional area of the duct.

In an exemplary embodiment the present active sound-cancellation computer program may comprise instructions to reduce a sound pressure leaving the duct by >20 dB, in particular by >25 dB, more in particular by >30 dB, such as by >40 dB for at least one frequency, in particular for 2-20 frequencies. Such could depend on the initial sound level, in that lower sound levels may be more difficult to reduce.

In an exemplary embodiment the present active sound-cancellation computer program may comprise instructions to calculate and/or predict a sound pressure over a longitudinal axis of the duct and/or over a cross-sectional area of the duct.

In an exemplary embodiment the present active sound-cancellation computer program may comprise instructions to feed forward activate at least one actuator.

In an exemplary embodiment the present active sound-cancellation computer program may comprise instructions to activate an $n+1^{th}$ actuator by an $n^{th}$ sensor, based on the input of the $n^{th}$ sensor.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

DETAILED DESCRIPTION OF FIGURES

Figure 1:
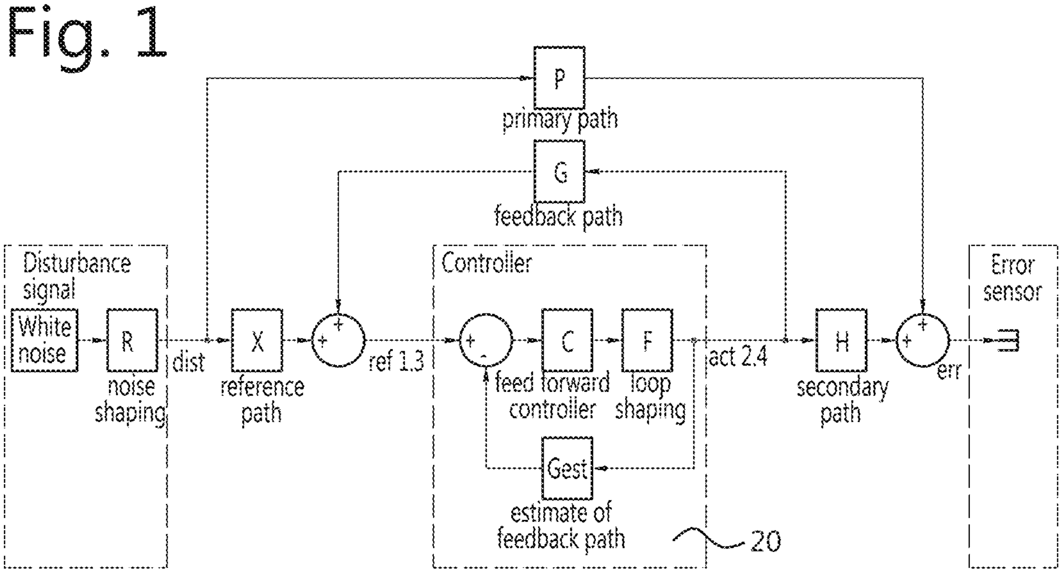
FIGS. 1, 2*a-c*, 3*a-b*, 4-6, 7*a-e* and 8 show details of technical features.

In the figures:

1 sound-cancellation system
10 carrier
11 fixator
12 array
13 sensor
14 actuator
20 sound cancellation controller FIG. 1 shows an experimental set-up, wherein All paths from actuators and disturbance actuator to all reference sensors and the error sensor are determined, one actuator at the time. The other actuators are turned off. These paths correspond to G, H, P, X in FIG. 1.

Figure 2A:
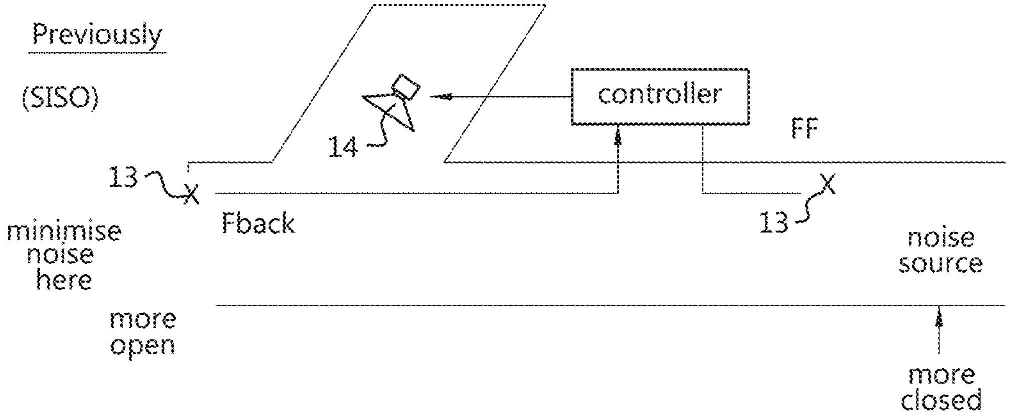
Figure 2B:
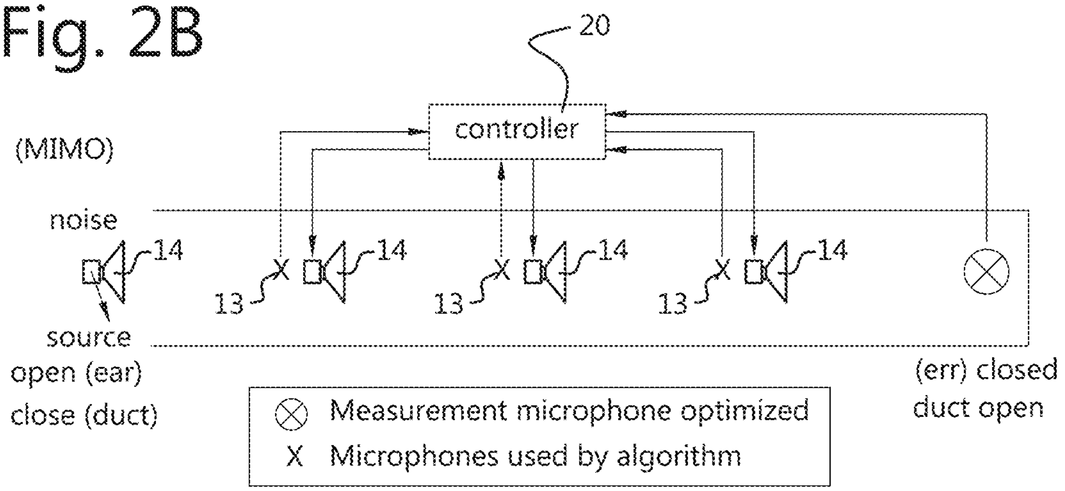
Figure 2C:
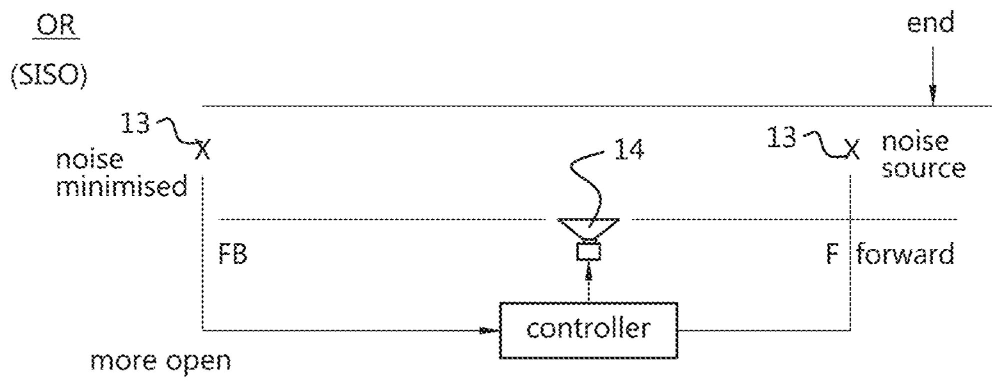

FIG. 2*a* shows schematics of a prior art single-input-single output set-up. FIG. 2*b* shows schematics of the present multiple-input-multiple-output system. FIG. 2*c* shows schematics of a prior art single-input-single output set-up.

Figure 3A:
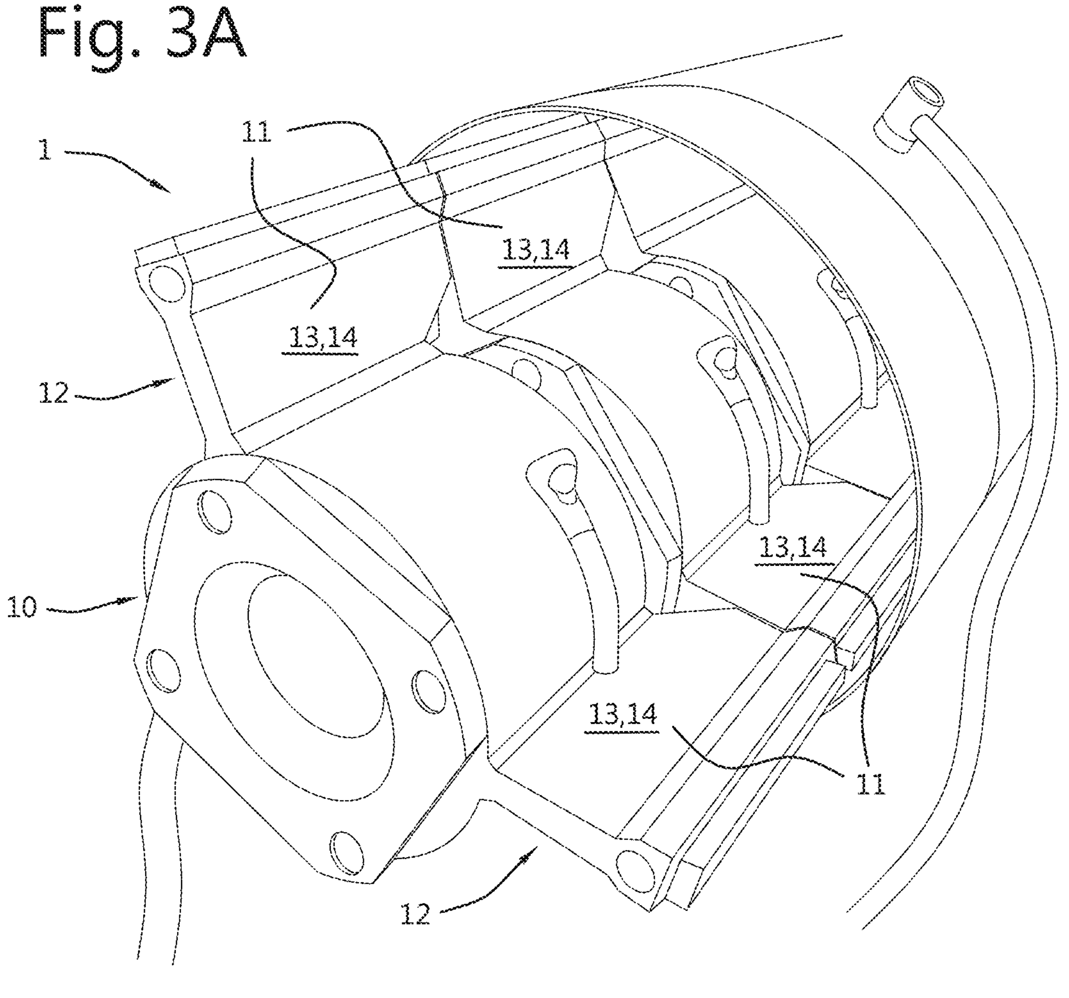
Figure 3B:
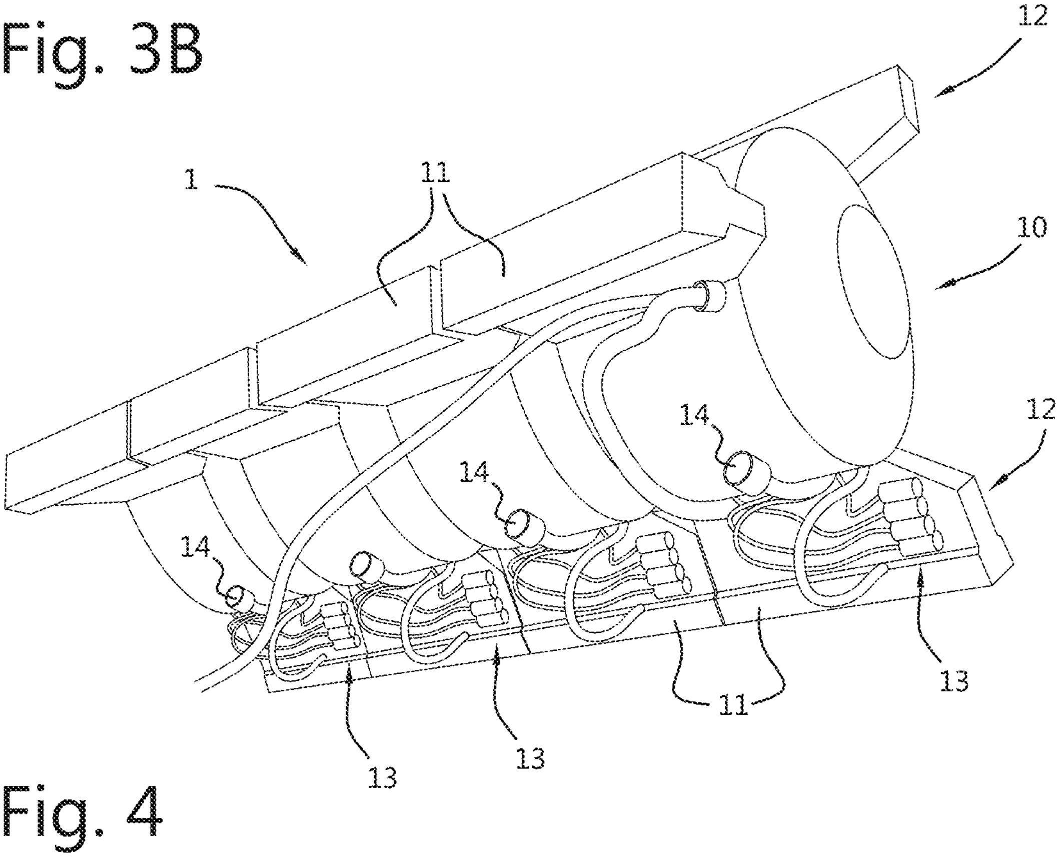

FIG. 3*a-b* shows an exemplary MIMO system with 4 sensors and actuators (numbered accordingly), and a duct in FIG. 3*a*, wherein the MIMO-system partly is incorporated, for visibility only.

Figure 4:
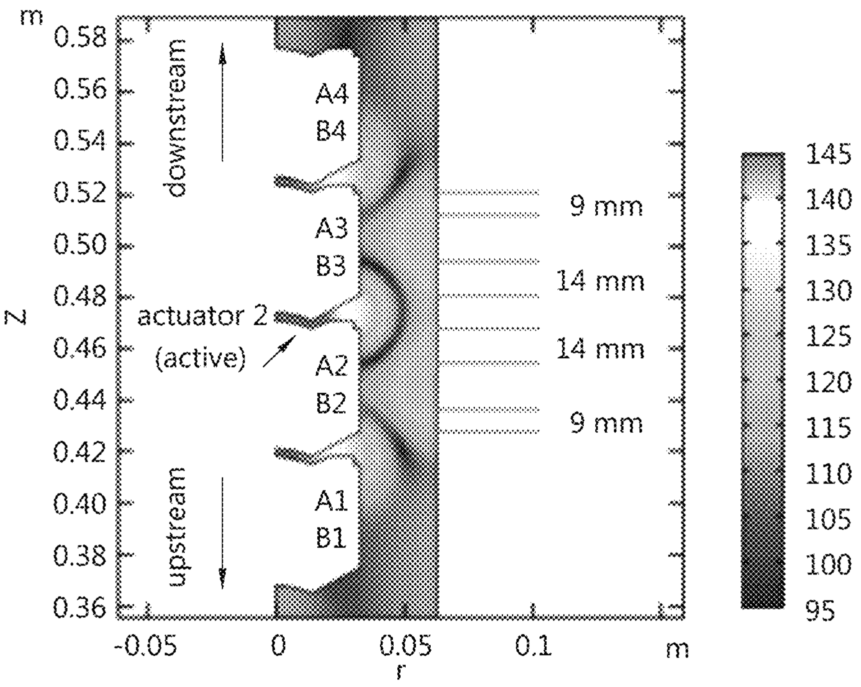

FIG. 4 shows a simulation of sound pressure level (dB) of a parasitic mode shape at 4226 Hz and possible reference sensor positions A,B, respectively. In the figure, only actuator 2 is active.

Figure 5:
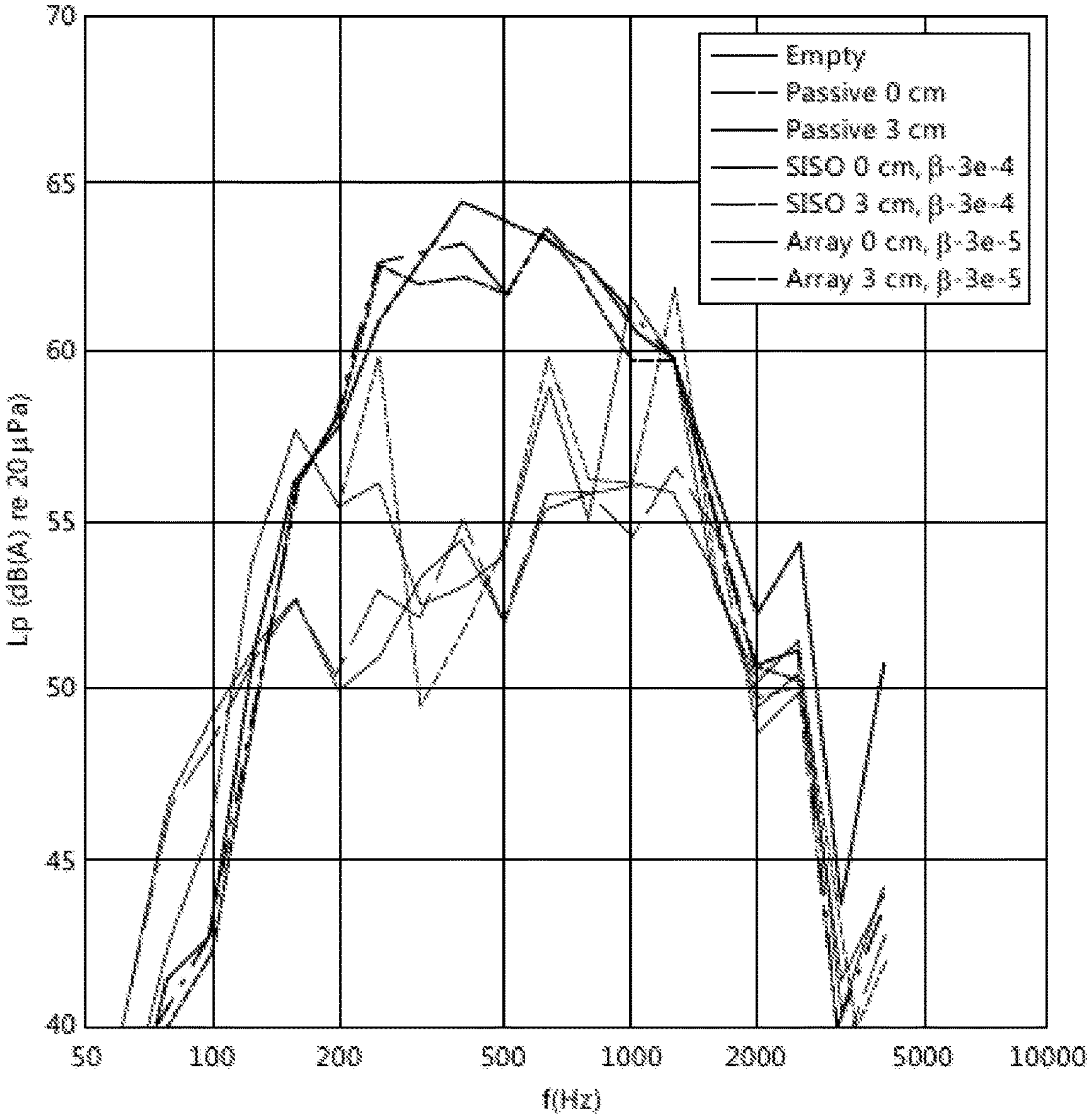

FIG. 5 shows performance comparison for best performing set-ups of the prior art system (SISO), the present system ("array"), in comparison to an empty and two passive setups.

Figure 6:
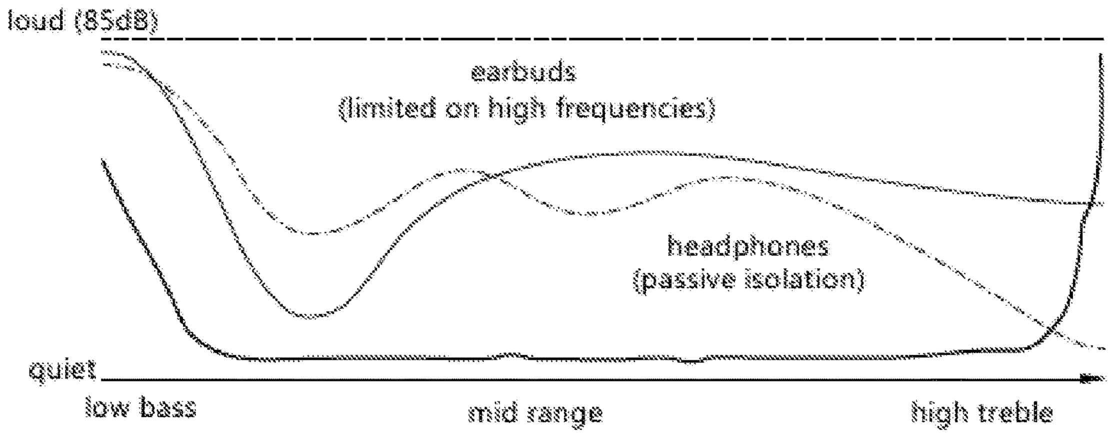

FIG. 6 shows the noise reduction of the present system compared to ear-buds and head-phones.

FIG. 7A-E and FIG. 8 show experimental results.

The figures are further detailed in the description.

The invention although described in detailed explanatory context may be best understood in conjunction with the accompanying figures.

Experimental Results

The experimental results have been a result of an MSc-Thesis program of C. Jansen, with title "ACTIVE NOISE CONTROL IN VENTILATION DUCTS USING A DISTRIBUTED LOUDSPEAKER AND MICROPHONE ARRAY", under embargo until Jun. 17, 2021, which document and its contents are incorporated by reference.

A silencer (sound cancellation system) is designed with the following performance goals in mind: over its intended bandwidth, it should only couple to plane waves, minimize acoustic feedback from actuators to reference sensors, have sufficient output capability for a typical residential application, have its actuators and reference sensors remain within their linear regimes, have no or well damped resonances in its transfer functions related to actuators or reference sensors, fit inside a duct of 125 mm diameter and have no passive damping material. It is desirable to extend the bandwidth to a frequency as high as possible. Initially, an array length of four elements has been chosen arbitrarily. Later on, computational limitations resulted that only three reference sensors and actuators could be used. Simulations with COMSOL Multiphysics have been performed to optimize the geometry. A schematic drawing of the finished silencer is shown in FIG. 3*a-b*. Each identical element contains one Tymphany 830970 loudspeaker (actuator) and three Kingstate KECG2742TBL-A microphones (together forming a reference sensor) having a flat frequency response of 20-8 k Hz 1 dB connected in parallel. The dimensions are kept as small as possible, with a diameter of 65 mm and length of 53 mm, resulting in an internal volume of 0.09 L which is lightly stuffed with polyester wadding. The actuators, typically a speaker, are selected on the basis of swept volume and compact dimensions and have a resonance frequency of about 260 Hz when mounted. They are driven by a Caliber CA75.4 car audio amplifier. The enclosure wall that opposes the actuator of the adjacent element follows has a conical shape, while following the shape of the dome at the centre of the actuators diaphragm, to increase the frequency of the parasitic resonance of the air gap.

As a sample, the mode shape is investigated when actuator 2 is active and the other actuators are turned off. The resulting mode shape is shown in FIG. 4 and has been simulated with anechoic duct terminations.

All paths from actuators and disturbance actuator to all reference sensors and the error sensor are determined, one actuator at the time. The other actuators are turned off. These paths correspond to G, H, P, X in FIG. 1. The actuator under investigation is fed a pink noise signal, while both this signal and all reference and error sensor signals are measured. Ten seconds of signals are captured, after having allowed the system to settle for two seconds. Then FIR filters are fit to them, using a least mean squares fit that minimizes the difference between the output and filtered input signal. The disturbance signal and the error sensor are only part of the experimental set-up, not of the present sound-cancellation system.

The controller structure is feed forward with feedback cancellation. A schematic of the controller and relevant acoustic paths is shown in FIG. 1. Grey areas represent digital signal manipulation in the Micro-LabBox, for which the code is generated by Simulink. These are: feed forward controller C. loop shaping filter F, estimate of feedback path Gest and noise shaping filter R. Blocks outside of the grey areas represent electro-mechanical paths, which all include, in the following order: digital to analogue conversion, amplifier, loudspeaker, acoustic path, microphone, microphone preamplifier, analogue to digital conversion and a discrete second order Butterworth high pass filter at 1 Hz. These are acoustic feedback path G, secondary path H. primary path P and reference path X. Note that all inputs and outputs of the MicroLabBox are signals to actuators and from sensors. Therefore reference path X not only contains the path from sound field to reference signal, but also the path from disturbance actuator signal to sound field.

Due to limitations in processing power in the experimental set-up, only actuator 2-4 and reference sensor 1-3 are used for the array. These are chosen to maximize the time lead between reference sensors and actuators. The filter lengths could not be shortened, because the impulse responses of the real paths they describe takes some time to decay. The SISO system uses actuator 4 and reference sensor 1. These are chosen because this results in the same maximum time lead as for the array and because it is expected that the coherence between these is good, as the acoustic feedback path has a smooth transfer function as compared to other—reference sensor pairs.

Stability robustness is determined by the feedback path caused by acoustic feedback from actuators to reference sensors. This cannot be completely cancelled, leaving a residual that can lead to instability. There may be several causes for imperfection of the feedback estimate, such as a change in temperature or air velocity.

Robustness is pursued by trying to keep the gain of all individual feedback paths $CF(G-G_{est})$ below 1 at all frequencies. This is implemented in the following way. It is assumed that effort weighting causes C to have a flat amplitude response, of which the level is dependent on the amount of effort weighting. Therefore F(G-Gest) must have flat amplitude responses as well. First, the transfer functions G-Gest from actuators to reference sensors including imperfect feedback cancellation are estimated. Then for each actuator, the worst transfer function to the reference sensors is picked. An FIR filter F with a length of 801 taps, having an inverse amplitude response and minimum phase behaviour, is designed, and added to the relevant actuator. Its transfer function is the inverse of G-Gest multiplied by the desired open loop response. To avoid compensating for narrow-band notches in the frequency response, F is taken to be the lowest value of this inverse and the smoothed inverse. Actuator overload at low frequencies is limited by limiting the gain of Fat f<300 Hz to that of a first order high pass filter. The resulting filter is made minimum-phase. Performance robustness additionally is determined by noise gain. Noise is generated by turbulence and by the circuit inside the microphones.

Steel spiro ductwork of 125 mm diameter has been used. Airflow is not taken into account and the air is at room temperature. The disturbance signal is generated by a Tang Band W2-2040s loudspeaker mounted in the centre leg of a T joint. The cavity between loud-speaker housing and duct wall is filled by melamine foam. At one side of the joint is a straight duct of 111 cm, containing the silencer, and terminated by an exit. At the other side there is an anechoic termination, made from a straight duct of 150 cm, with a closed end, loosely filled with polyester wadding. The exit has three microphones in parallel to capture the residual signal, together forming the error sensor. For calculation of noise shaping filter R, the exit was replaced by another straight duct of 150 cm, with a closed end. Both straight ducts are loosely filled with polyester wadding to make them appear as anechoic terminations. The silencer was removed, and a single microphone was placed inside the duct, midway between duct top and bottom at a node of the first vertical mode, and 39 mm towards the side wall at a node of the first axisymmetric mode. The microphone is not at a node of the first lateral mode between the duct side walls, which is not a problem, because this mode is not excited due to symmetry.

CONCLUSION

An array of three reference sensors and three actuators has a larger insertion loss than the SISO system, by coupling to the sound field over a wider range of frequencies and avoiding the necessity of having large gains in the controller at some frequencies. The advantage in this experiment is caused by the arraying of the reference sensors, while the setup was such that the results are not suitable to draw conclusions about arraying of the actuators. At the same value of effort weighting parameter /3, the array performs similar to the SISO system. The array obtains a higher insertion loss than the SISO system, because more effort weighting can be applied, without the system becoming unstable. The maximum insertion loss for the array was 6.7 dB(A) and for the SISO system it was 3.9 dB(A), yielding a difference of 2.8 dB(A), and the array has the added advantage that the residual has a more even spectrum. For the specific disturbance of shifting the reference sensors and actuators by 3 cm, the performance robustnesses are similar.

FURTHER EXAMPLES

It is noted that two phenomena are considered to affect the design of ducted active noise cancellation systems and are explained. The present array approach covered manages both effects. For non-linearities other non-array techniques are also listed.

Observability and Controllability

The acoustic observability and controllability issue is considered a fundamental property of a duct and single microphones, and speakers, are typically unable to detect and or correct for specific frequencies if present in the unwanted disturbance. The present array of strategically placed elements overcomes this fundamental limitation.

Non-Linearities

Non-linearities are considered inevitable in real systems and may originate within any domain and propagate to other domains. Moving coil actuators (speakers) are prone to non-acoustic non-linearities at lower frequencies. It is noted that in a ducted system nonlinearities are amplified significantly at specific frequencies and significantly impact noise cancellation performance.

Observability and Controllability

With reference to FIGS. 7A-E (Transfer functions for the SISO system shown (Prim, Sec1 are actuators; Ref1 and err are micro-phones).

Figure 7A:
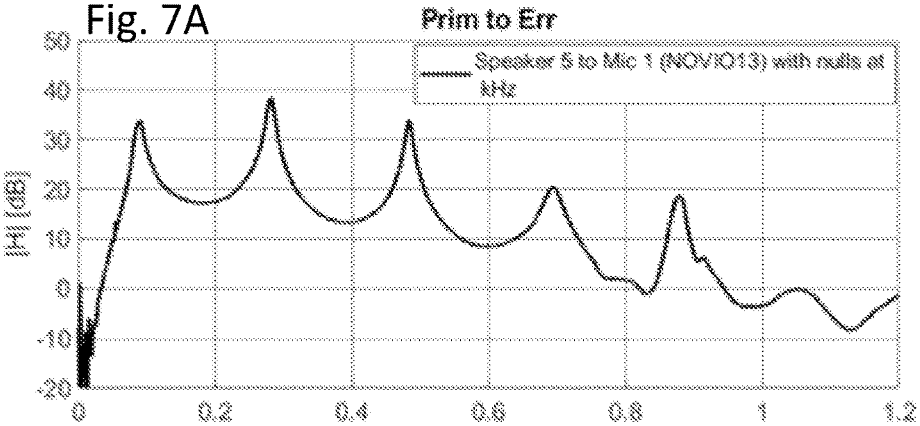
Figure 7B:
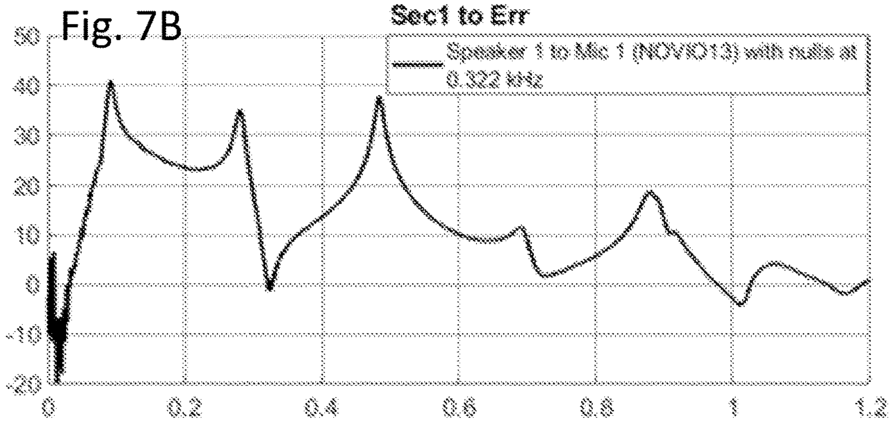
Figure 7C:
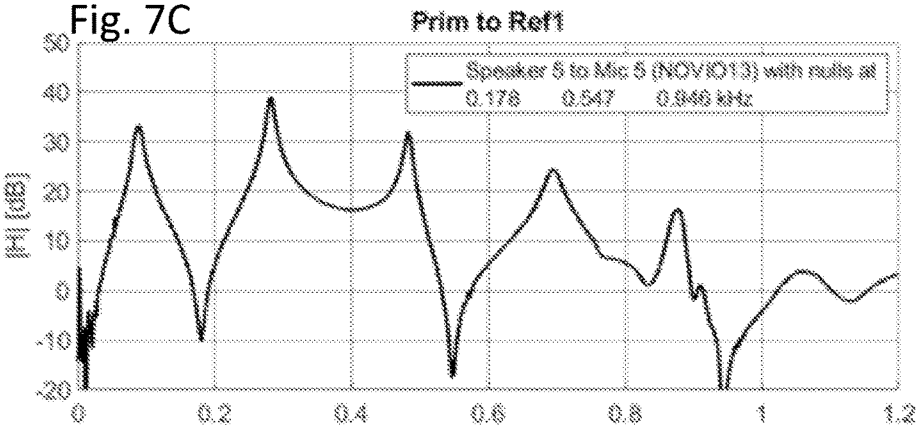
Figure 7D:
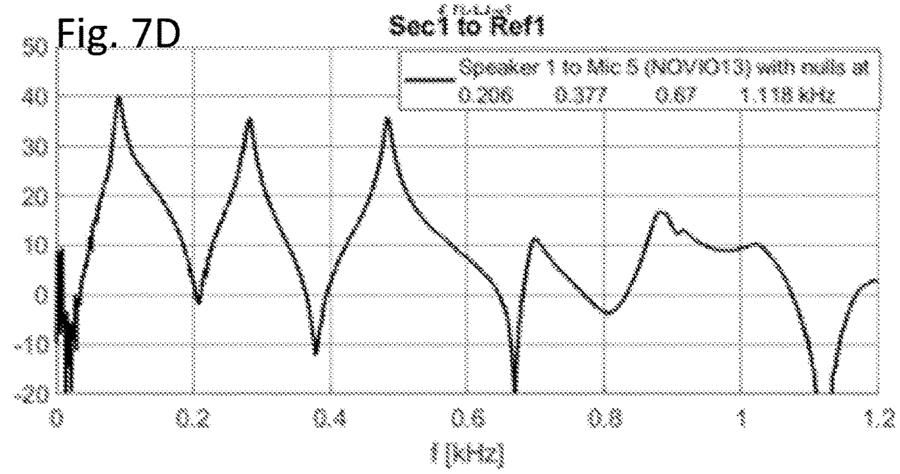
Figure 7E:
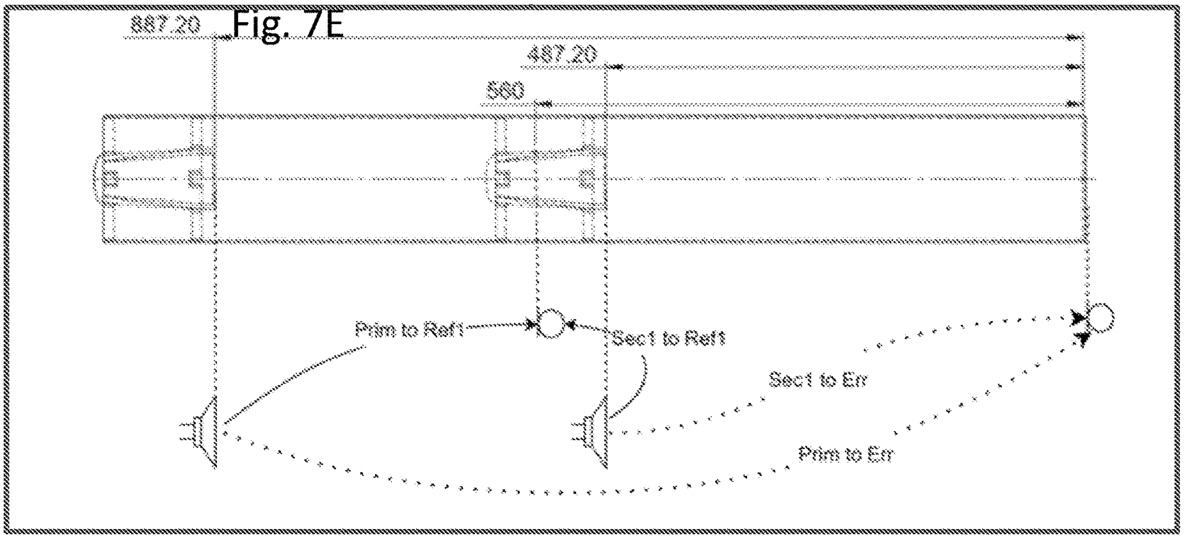
Figure 8:
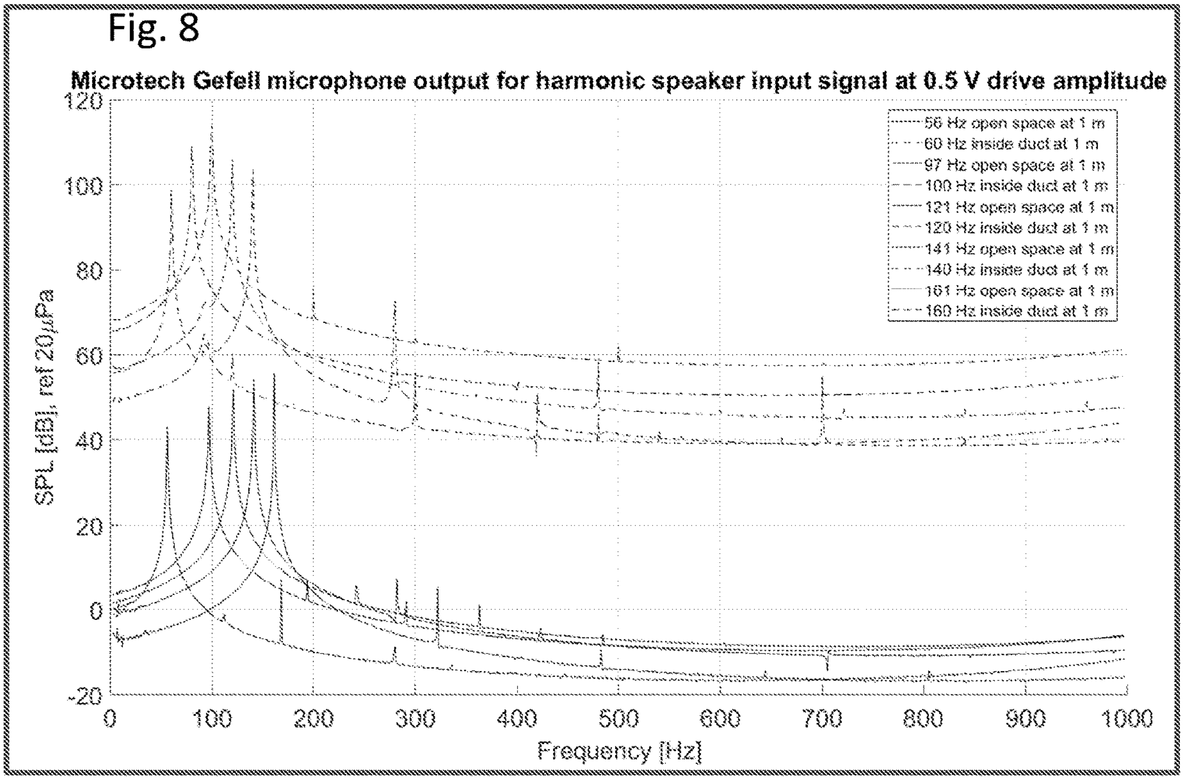

FIG. 7E shows three forward paths and one feedback path

Feedforward: Disturbance source (Prim) to optimisation point (Err) (FIG. 7A)

Feedforward: Audio controller speaker (Sec1) generating anti-noise in the centre to optimisation point (Err) (FIG. 7B)

Feedforward: Disturbance source to sensing microphone (Prim to Ref1) (FIG. 7C)

Feedback: Audio controller speaker (Sec1) to sensing microphone (Ref1) (FIG. 7D)

The four graphs 7A-D show the transfer functions for each of these paths.

Natural Characteristic for a Duct:

FIG. 7A shows a typical transfer function for the disturbance to error path for an open duct at the disturbance end with a closed receiver end (as in an ear-canal).

Controllability Issue: FIG. 7B shows the transfer function of the Sec1 to Err. Note the null at 322 Hz. The speaker Sec1 has limited ability to control this frequency at the Err microphone. The controller may correctly drive the speaker to generate the required correction signal however the transfer function shows that its amplitude of the anti-sound at the Err microphone will be low and unable to cancel a disturbance at this frequency.

Observability Issue: FIG. 7C shows the transfer function from the prim to the ref1 microphone. There are three nulls in this experimental configuration at 178, 546, 987 Hz. Any frequency components at these frequencies are significantly attenuated at the reference microphone. They are not detectable (observable) by the microphone. This prevents the controller from taking corrective action—it simply cannot see an issue.

The observability and controllability sensitivity are fundamental for a single element system. Using the present array of sensors and actuators with enough elements can properly observe and control the whole frequency range.

Non-Linearity

The speakers generate the non-linearities in this experimental data. At low frequencies the actuator generates the solid line curves measured at 1 m in free space. When the same transducer is placed in a duct the energy no longer dissipates as it is contained with the duct leading to higher sound pressure levels. Harmonic content falling at critical frequencies is disproportionally amplified by the duct (The sensitivity is at the duct eigenfrequencies—See Prim to Err transfer function above).

Consider a 56 Hz source date in free space. The $5^{th}$ harmonic is at 280 Hz and is relatively inconspicuous at about 50 dB below the fundamental. The same frequency generates the largest component at 280 Hz in the ducted system (dashed lines). It is now only about 20 dB below the fundamental and would significantly impact the overall noise cancellation performance if the disturbance contained 56 Hz.

In a single actuator system, a much higher quality lower distortion device must be used to avoid generating the non-linearities. The actuator is likely to be larger and more expensive. Achieving high performance at high SPL will remain challenging.

In the present array-based system specific actuators are configured to avoid operating at frequency that generate high distortion allowing lower cost components without compromising performance. Alternatively, local feedback control linearises (reduce) the distortion, or pre-compensation (or sometimes post compensation) reduces the distortion.

It should be appreciated that for commercial application it may be preferable to use one or more variations of the present system, which would be similar to the ones disclosed in the present application and are within the spirit of the invention.

The invention claimed is:

1. An active sound-cancellation system for an open fluid-duct comprising a carrier, the carrier comprising at least one fixator for fixing the carrier to the duct, at least one axial array of $n_s \times m_s$ audio sensors and $n_a \times m_a$ audio actuators, wherein, each individually, $n_{a,s} \geq 2$, and $m_{a,s} \geq 1$, wherein $n_s$ sensors and $n_a$ actuators are parallel to the axis of the duct, and wherein $m_{a,s} \in [2,2^6]$, and at least one sound-cancellation controller, wherein the at least one sound-cancellation controller is configured to receive audio input from the at least one sensor array, configured to process said audio input, and configured to provide output to the at least one actuator array, wherein said output activates the actuator to reduce sound in a frequency domain of 10 Hz-100 kHz, wherein at least one sound-cancellation controller is adaptable, characterized in that in the longitudinal direction at least one sensor and at least one actuator are each individually spaced apart, at a distance of 1-25% of a duct diameter.

2. The active sound-cancellation system according to claim 1, comprising at least one of a clock operating at a frequency of 1 Hz-10 GHz, at least one low-latency high resolution sigma-delta analogue-digital converter (ADC) for providing at least one of a single and multiple-bit output stream, at least one ADC analogue input, at least one ADC digital output, the at least one ADC digital output being in electrical connection with a digital loop filter, at least one digital loop filter in digital connection with at least one ADC, having at least one digital output, the at least one digital loop filter operating in a time domain, and at least one pulse width modulating (PWM) controller for receiving digital output from the digital loop filter and providing PWM output, wherein the controller is programmable and adaptable, wherein the ADC latency in use is one clock cycle, and wherein the sound-cancellation controller is selected from an integrated circuit, an artificial intelligence unit, a trainable and adaptable artificial intelligence unit, and embedded software.

3. The active sound-cancellation system according to claim 1, wherein the at least one audio sensor is capable of receiving audio-signals at a frequency of 5-100000 Hz, and wherein the at least one actuator is capable of providing audio-signals at a frequency of 5-100000 Hz.

4. The active sound-cancellation system according to claim 1, wherein the at least one sensor each individually is configured to sample at a sample frequency of 100 Hz-100 MHz, and wherein each sensor individually comprises at least one field effect transistor, and wherein a series of $n_s$ and $m_s$ sensors is connected in series.

5. The active sound-cancellation system according to claim 1, wherein the at least one actuator each individually is configured to provide active sound cancelling at a cancelling frequency of 1 kHz-500 kHz, and wherein the at least one actuator each individually is configured to provide a sound pressure of 20-150 dB, and wherein in a row of n actuators the actuators are configured to be in phase at a given frequency.

6. The active sound-cancellation system according to claim 1, wherein the at least one sensor and at least one actuator are each individually a transducer, and wherein the transducer is selected from a MEMS, a moving coil, a permanent magnet transducer, a balanced armature transducer, and a piezo-element.

7. The active sound-cancellation system according to claim 1, wherein in an axial array, each individually, 50-100% of array elements is provided with a sensor and an actuator, respectively.

8. The active sound-cancellation system according to claim 1, comprising 2-10 axial arrays, and wherein axial arrays are at least partly provided along a horizontal axis.

9. The active sound-cancellation system according claim 1, wherein in the longitudinal direction the at least one sensor and at least one actuator are each individually spaced apart at a distance of 2-10% of a duct diameter, and wherein each individual sensor is coupled to activate at least one individual actuator.

10. The active sound-cancellation system according to claim 1, wherein the fixator is at least one fin.

11. The active sound-cancellation system according to claim 1, wherein each actuator individually is configured to provide at least one of a sound pressure perpendicular to the longitudinal axis of the system, and a sound pressure parallel to the longitudinal axis of the system.

12. The active sound-cancellation system according to claim 1, wherein an $n+1^{th}$ sensor is positioned adjacent along a horizontal axis of the sound-cancellation system of an $n^{th}$ actuator.

13. The active sound-cancellation system according to claim 1, wherein the system comprises at least one of a primary feedforward path and a feedback path for cancellation, the feedforward path receiving output from a sound shaper and providing input to a second adder, the sound shaper is configured to shape propagation of a sound wave, phase, and frequency of sound, after noise filtering above 100 kHz, the feedback receiving output from the at least one sound-cancellation controller output and providing input to the at least one first adder.

14. The active sound-cancellation system according to claim 1, wherein the system comprises at least one of a first adder receiving input from the feedback path and a reference path, respectively, wherein the first adder provides input to a first subtractor of the at least one sound-cancellation controller, wherein the at least one sound-cancellation controller comprises a feed forward sound-cancellation controller receiving input from the first subtractor and providing output to a loop-shaping filter, the loop-shaping filter providing input to the sound-cancellation controller output and to an estimator in a sound-cancellation controller feedback path, the sound-cancellation controller feedback path providing input to first subtractor for subtracting from the first adder.

15. The active sound-cancellation system according to claim 1, wherein the system further comprises at least one secondary path receiving input from the sound-cancellation controller output and providing output to a second adder, the second adder optionally providing output to an error sensor.

16. An open fluid-duct comprising an active sound-cancellation system according to claim 1, wherein the fluid duct is an air-duct, selected from a ventilation, a pump, a heating installation, a cooling installation, a window, an exhaust, a motor of a ship, a motor of a heavy engine, an internal combustion airbreathing engine, an internal combustion airbreathing jet engine, a jet-engine, a turbojet, a turbofan, a ramjet, a pulse jet, and a pipe-line.

17. The open fluid-duct comprising an active sound-cancellation system according to claim 16, wherein the active sound-cancellation system is positioned on a longitudinal axis of the duct, and wherein the active sound-cancellation system is positioned in the 10-40% downstream section relative to a length of the longitudinal axis part of the duct, and wherein the active sound-cancellation system is positioned at a junction in the fluid duct, and wherein a frontal surface area of the active sound-cancellation system is 2-75% of the cross-sectional area of the duct.

18. An active sound-cancellation computer program comprising instructions for operating an active sound-cancellation system according to claim 1, the instructions causing the computer to carry out the following steps:

activating the at least one sensor, receiving input from the at least one sensor, the input comprising sound spectral and sound pressure information, activating the at least one actuator, therewith performing one of reducing sound pressure in the duct and leaving the duct for at least one sound frequency.

19. The active sound-cancellation computer program according to claim 18, comprising instructions to activate at least two sensors simultaneously, and to activate at least two actuators simultaneously, to measure the sound pressure over a longitudinal axis of the duct and over a cross-sectional area of the duct, and to reduce a sound pressure leaving the duct by >20 dB.

20. The active sound-cancellation computer program according to claim 18, comprising instructions to calculate and predict a sound pressure over a longitudinal axis of the duct and over a cross-sectional area of the duct, and comprising instructions to feed forward activate at least one actuator, and comprising instructions to activate an $n+1^{th}$ actuator by an $n^{th}$ sensor, based on the input of the $n^{th}$ sensor.

* * * * *